US006769384B2

(12) United States Patent
Dougherty (10) Patent No.: US 6,769,384 B2
(45) Date of Patent: Aug. 3, 2004

(54) RADIAL INTERNAL COMBUSTION ENGINE WITH FLOATING BALANCED PISTON

(76) Inventor: Thomas J. Dougherty, 3005 Mesa Verde Dr., Waukesha, WI (US) 53188

( * ) Notice: Subject to any disclaimer, the term of this patent is extended or adjusted under 35 U.S.C. 154(b) by 0 days.

(21) Appl. No.: 10/190,467

(22) Filed: Jul. 5, 2002

(65) Prior Publication Data

US 2003/0005894 A1 Jan. 9, 2003

Related U.S. Application Data

(60) Provisional application No. 60/303,925, filed on Jul. 7, 2001.

(51) Int. Cl.[7] .............................................. F02B 75/22
(52) U.S. Cl. .................................. 123/54.1; 123/197.1
(58) Field of Search ............................. 123/54.1–54.8, 123/197.1

(56) References Cited

U.S. PATENT DOCUMENTS

| 735,035 A | 7/1903 | Jones |
| 1,455,443 A | 5/1923 | Mayer |
| 1,904,680 A | * 4/1933 | Ferry ...................... 123/188.8 |
| 2,044,113 A | 6/1936 | Woolson |
| 2,419,305 A | 4/1947 | Woolson et al. |
| 2,491,630 A | 12/1949 | Voorhies |
| 2,618,253 A | 11/1952 | Angle |
| 2,671,983 A | 3/1954 | Roehrl |
| 3,308,797 A | 3/1967 | Buyatti et al. |
| 3,734,072 A | 5/1973 | Yamda |
| 3,964,450 A | 6/1976 | Lockshaw |
| 4,084,555 A | 4/1978 | Outlaw |
| 4,194,404 A | 3/1980 | Jager et al. |
| 4,727,794 A | 3/1988 | Kmicikiewicz |
| 5,003,935 A | 4/1991 | Goldowsky |
| 5,682,843 A | 11/1997 | Clifford |
| 5,803,041 A | 9/1998 | Motakef |
| 6,223,711 B1 | 5/2001 | Pelz |
| 6,250,279 B1 | 6/2001 | Zack |
| 6,318,067 B1 | 11/2001 | Marquard |
| 6,349,696 B1 | 2/2002 | Shang et al. |

FOREIGN PATENT DOCUMENTS

| DE | 561765 | 9/1932 |
| FR | 675425 | 11/1929 |
| GB | 392282 | 5/1933 |
| GB | 1149988 | 4/1969 |
| WO | WO 01/77494 A1 | 10/2001 |

OTHER PUBLICATIONS

Patent Abstract of JP 59 077001, May 1984.

* cited by examiner

Primary Examiner—Noah P. Kamen
(74) Attorney, Agent, or Firm—Quarles & Brady LLP (57) ABSTRACT

A radial piston engine is disclosed wherein power is transferred such that the power take-off is truly balanced, where the piston runs truly parallel to the cylinder walls. This concept reduces wear of the cylinders and piston rings. The engine provides improved gas mileage due to the reduced piston drag. One unique feature is the power take-off from the piston to the flywheels. The design takes power from inside the cylinder compartment, through four transfer arms, to cams that in turn transfer the power to two flywheels. By firing complimentary cylinders 180 degrees at the same time, almost no vibration is noticed. Also, since the cylinders can fire many times per flywheel rotation, the torque which this engine produces is greater other designs. Any number of cylinders is possible. Single cylinders and two cylinder designs with chain power take-offs are also possible for lawnmowers and motorcycles.

24 Claims, 4 Drawing Sheets

RADIAL INTERNAL COMBUSTION ENGINE WITH FLOATING BALANCED PISTON

CROSS-REFERENCES TO RELATED APPLICATIONS

This application claims the benefit of U.S. Provisional Patent Application No. 60/303,925 filed Jul. 7, 2001

STATEMENT REGARDING FEDERALLY SPONSORED RESEARCH

Not Applicable.

BACKGROUND OF THE INVENTION

1. Field of the Invention

This invention relates to a radial internal combustion engine.

2. Description of the Related Art

Radial engines are well known, and many attempts have been made to improve their ability to transfer the power of the exploding gas into mechanical power. The two major types of radial engines are the piston and the rotary engines. Although most radial engines are used for aircraft, many designs can be used in any application.

Various ways to improve the radial piston engine have been proposed. For example, U.S. Pat. No. 4,084,555 describes a slosh plate type design that is used to transfer engine power to the power take-off. However, this design does not offer high torque and places all of the power transfer to one small location on the plate. The engine in U.S. Pat. No. 4,194,404 uses a connecting rod for energy transfer but still places undo force on the piston and cylinder walls. The engine in U.S. Pat. No. 4,727,794 does reduce the piston friction, but a larger engine block and an offset to the piston rods are used which can increase vibration. The engine in U.S. Pat. No. 3,964,450 does reduce the friction by locking in the piston rod with thrust bearings. However, the design uses a moving vane to transfer energy. This design requires a larger outside diameter to transfer power to, and as a result, spark plugs and injectors may not be placed in the best place for low emissions. The engine in U.S. Pat. No. 5,003,935 is principally designed to reduce noise and does not necessary try to improve output performance. The engine in U.S. Pat. No. 5,803,041 is a design that uses vanes or flapper valves to transmit the energy depending where the engine is positioned but does not offer the power handling capability of a piston design. Other background patents include U.S. Pat. Nos. 5,682,843, 6,223,711, 6,318,067, 6,250,279, 6,349,696, 4,056,906, 735,035, 2,044,113, 2,419, 305, 2,491,630, 2,618,253, 2,671,983, 3,308,797, 3,734,072, and foreign patents FR 675,425, GB 392,282, GB 1,149,988 and GB 4,101,476.

Thus, there is a continuing need for a radial piston engine wherein power take-off is truly balanced such that the piston runs truly parallel to the cylinder walls. There is also a need for a radial engine that provides improved gas mileage by reducing piston drag. There is also a need for a radial engine that produces greater torque.

SUMMARY OF THE INVENTION

The foregoing needs are met by a radial internal combustion engine according to the present invention. The engine includes an engine block having a plurality of combustion chambers radially arranged on the periphery of the engine block. Each combustion chamber is defined by a cylinder, a reciprocating piston contained within the cylinder, and a cylinder head on the periphery of the engine block. An exhaust port is associated with and in fluid communication with each combustion chamber. Each exhaust port includes an exhaust valve. An intake port is associated with and in fluid communication with each combustion chamber for directing intake air into its associated combustion chamber. Each intake port includes an intake valve. A fuel injector is associated with each intake port and its associated combustion chamber. Each fuel injector is positioned for directing fuel into intake air in its associated intake port or positioned for directing fuel into intake air in its associated combustion chamber to form an air-fuel mixture. A spark device is associated with each combustion chamber for igniting the air-fuel mixture in its associated combustion chamber. The engine includes an output shaft, and at least one flywheel secured to the output shaft. At least one rotating gear is connected to each piston, and at least one rotating gear for each piston engages a surface of at least one flywheel. The reciprocating motion of each piston causes rotation of each rotating gear that engages a surface of at least one flywheel thereby causing rotation of at least one flywheel and the output shaft.

It was found all of the radial engine piston designs in the prior art either put some pressure on the cylinder walls due to crankshaft design action, or need a thrust bearing to support the push on a moving plate or wheel. The radial engine of the present invention eliminates the need for both and allows for a piston to be supported by four gear wheels that distribute the power to two flywheels that connect all clockwise rotating gears. This allows the piston at all times to run parallel to the cylinder wall with little resistance.

The radial engine of the present invention can be made in any size diameter and can be paralleled with more of the same units. The engine can be made with any number of cylinders. Typically, when manufactured with less than three cylinders, the radial engine of the present invention uses a chain drive. One preferred design for the radial engine of the present invention has eight or more cylinders of even numbers and fires the cylinders 180 degrees to each other in unison. This allows the flywheel to pick up the power evenly from four gear wheels.

The piston and block components are important features of the radial engine of the present invention. The piston is a very light low mass unit where the power, rather then going to a piston rod, goes to two flanges that can be permanent parts of the piston. The flanges bend out and turn 180 degrees to put the power takeoff outside of the engine block. This design can take many forms, such as multiple parts doing the same function and having a single piston stem that comes from the center of the piston that has a flange assembly alike to the above mentioned. The flange on the piston can be any size robust enough to handle the power delivery. The gear wheels can also be made larger or smaller to accommodate the size and compression requirements of the piston.

The header on top of the cylinder of the radial engine of the present invention can be of a traditional design. If one wanted to add a standard valve construction it could be accomplished by placing a sinusoidal design to the outside of the flywheel so that the valve lever arm would ride on this curvature producing the required up and down motion needed for the valve actuation. However, designs incorporating electronic valves can eliminate camshaft, rods and chains.

The entire engine block is housed in a two part container that can hold oil. Both sides of the container can hold oil or other fluids. This container can have the mounting brackets necessary to hold the engine in place in a vehicle or plane. Standard methods can pump the oil to the cylinders and to the gears and respective bearings. Water can pass around each cylinder as in conventional engines, and water lines can come out the outside diameter surface of the engine block. Air cooling is also suitable. Intake and exhaust manifolds are used wherein two cylinders share an intake and the next two cylinders share an outtake (exhaust). Gas is piped below the engine, outside the flywheel and main engine housing. Any number of cylinders is possible. Single cylinders and two cylinder designs with chain power take-offs are also possible for lawnmowers and motorcycles.

The radial engine of the present invention eliminates a number of problems with all earlier engines and is easy to build with its parts simple to fabricate. The engine block would require less metal then a conventional engine block and is easy to mold or extrude. Since there is no crankshaft, its weight and machining are eliminated. Because of its flat design, the radial engine of the present invention can also offer a lower profile in modern cars lowering the hood and making it safer especially for accidents involving pedestrians.

It is therefore an advantage of the present invention to provide a radial internal combustion engine that dramatically reduces cylinder friction and wear thereby improving gas mileage and lowering emissions.

It is another advantage of the present invention to provide a radial internal combustion engine that reduces the weight of the engine by eliminating a crankshaft and using less block material required to hold the other components in place thereby offering a significant weight savings.

It is yet another advantage of the present invention to provide a radial internal combustion engine that has increased torque. With the method of transfer of power from the gear to the flywheel, there is a 3–6 to 1 ratio of transfer depending on the size of the gear wheel. This allows for numerous cylinder firings per single rotation of the flywheels.

It is still another advantage of the present invention to provide a radial internal combustion engine that allows for a low mass piston, which provides for higher speeds and greater horsepower.

It is yet another advantage of the present invention to provide a radial internal combustion engine that can be used for standard internal combustion engines, diesel and 2 cycle designs. It can also be used as a pump if the power is reversed.

It is still another advantage of the present invention to provide a radial internal combustion engine that can be used in a single or two-cylinder engine where the flywheel is replaced with a chain pickup. This chain has a center pickup shaft below the piston(s) where the chain would go over the counter clockwise rotation gears and positioned over two freewheeling sprockets that transfer the power to the main shaft.

These and other features, aspects, and advantages of the present invention will become better understood upon consideration of the following detailed description, drawings, and appended claims.

DETAILED DESCRIPTION OF THE INVENTION

The present invention is directed to a radial piston engine wherein the power take-off is truly balanced and the piston runs truly parallel to the cylinder walls. Looking at FIGS. 1–4, a motor or pump 100 has an engine block 1 with cavities 20 designed to allow pistons 2 to fit in that cavity and assemble up into the cylinders 50. An eight cylinder configuration is shown. The pistons 2 have a flange 21 that is either an integral part of the piston or is bolted, welded or by some other means attached to the piston 2 to produce the same flange design. The flange 21 protrudes from both faces of the engine block 1 (the other side of the engine block having an identical view). The flange 21 may be narrower than the configuration shown to allow for assembly into the cylinder cavity.

Figure 1:
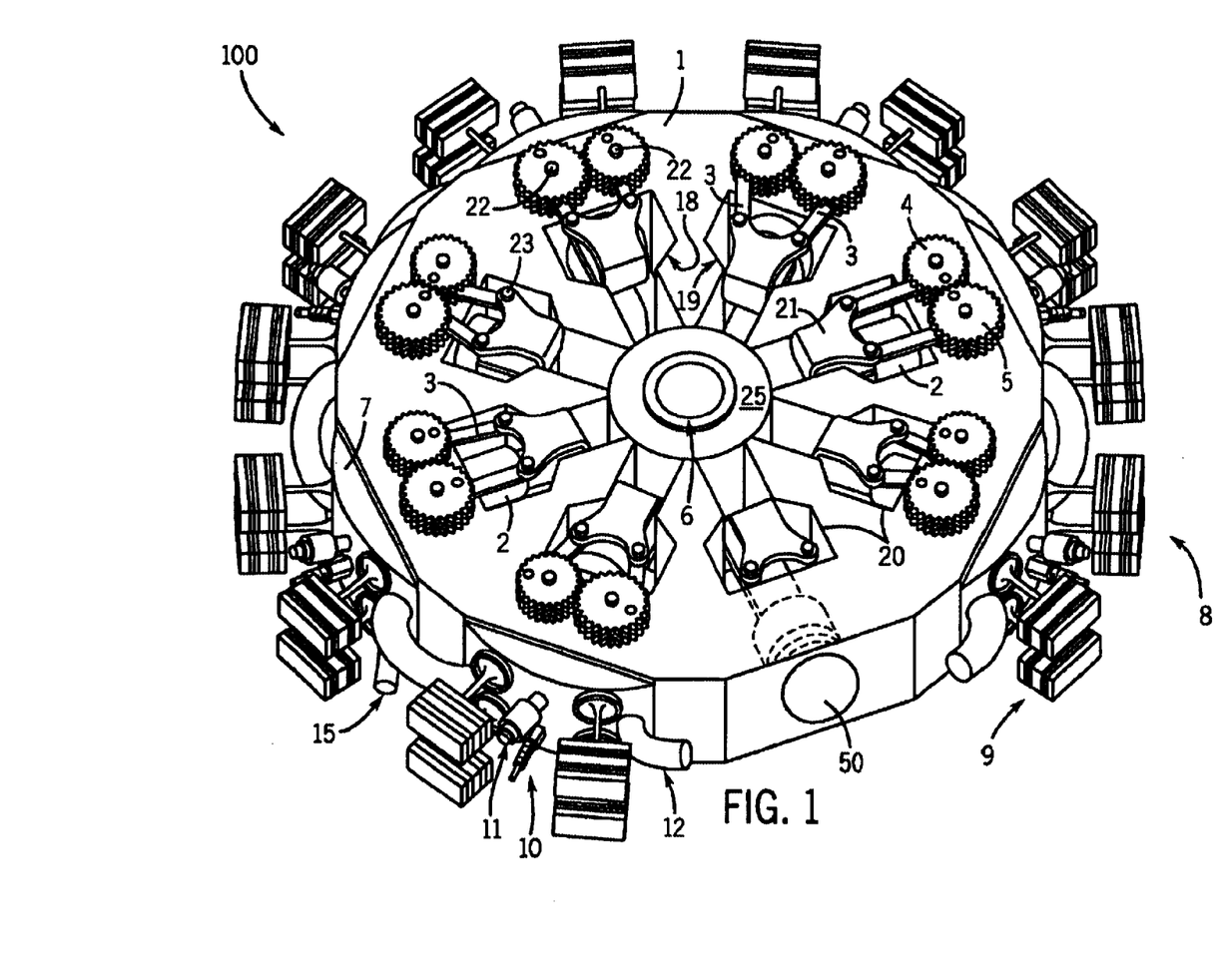
FIG. 1 is a perspective view of one side of the engine block and selected components of a radial internal combustion engine according to the invention. A perspective view of the other side of the engine block is identical.
Figure 2:
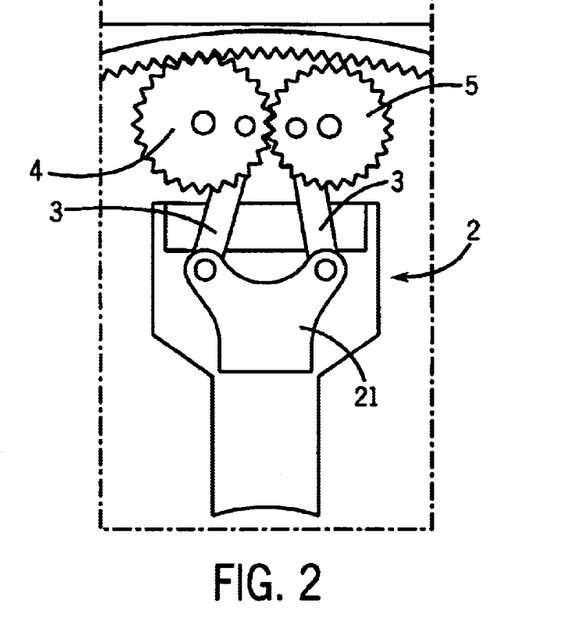
FIG. 2 is a top view of a piston of an engine according to the invention engaging the flywheel.
Figure 3:
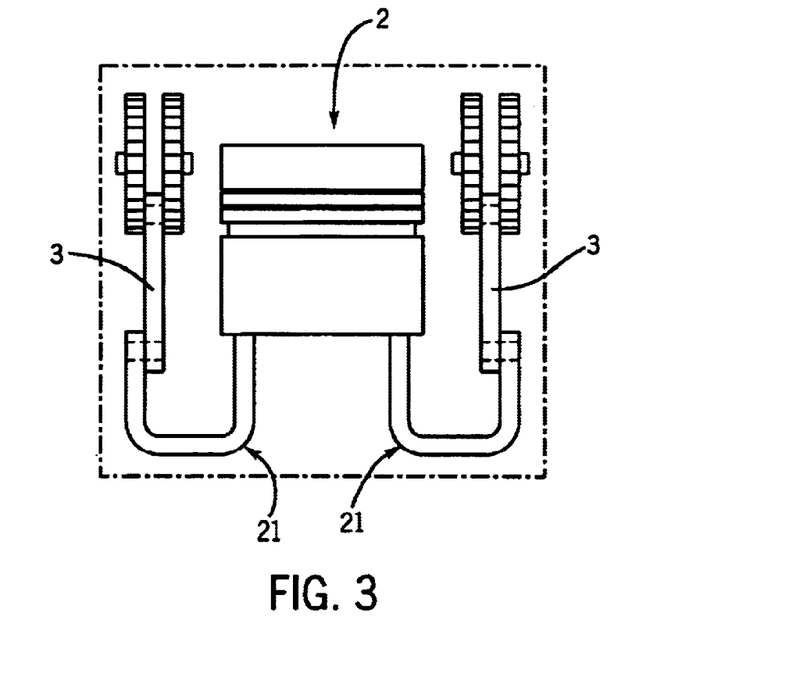
FIG. 3 is a side view of a piston of an engine according to the invention.

The piston flanges 21 are connected to four (two on each side) arms 3 that connect to gears 4 and 5. The arms 3 are connected with either simple rods 23, or with more elaborate bearings to the gears 4 and 5. These gears 4 and 5 are mounted in the engine block with center radial gear pins 22 that fit in bearings or sleeves. A cover plate, not shown, is used to locate the top of the gear pins 22. There is one plate with two gear pins 22 for each of the eight gear pairs. This cover plate can connect to the engine block 1 with screws, bolts or other fasteners.

Figure 4:
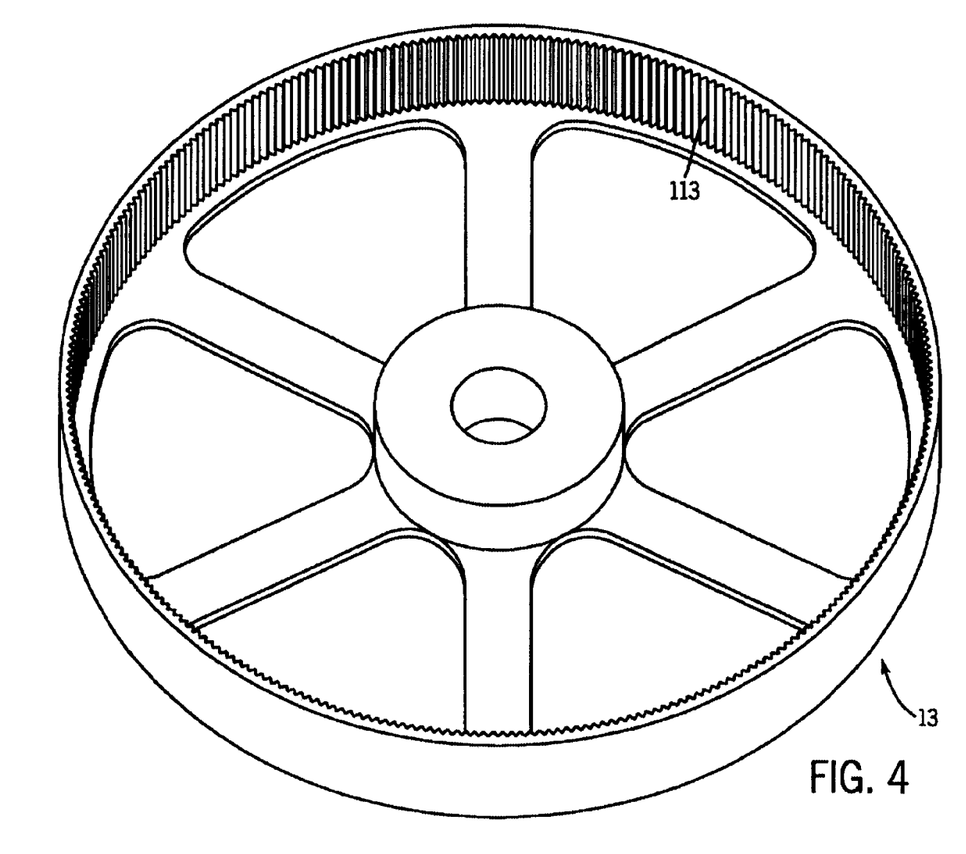
FIG. 4 is a perspective of a fly wheel of an engine according to the invention.

The gear 4 to the left in all cases is the transfer gear and it allows for the power to transfer to the flywheel 13 by meshing with teeth 113 on an inner surface of the flywheel 13. The right hand gear 5 engages with the left hand gear 4 but typically does not engage with the flywheel 13. If transfer is necessary for a very high torque motor, a third gear can be placed between the gear 5 and the flywheel 13 to allow for proper rotational engagement. The right hand gear 5 can be designed to be smaller (with the same amount of teeth) or be offset so that it engages with the left hand gear 5 but not the flywheel 13. Also, the right hand gear 5 can be designed to engage the flywheel 13 with the addition of an extra gear. It can be seen from the drawings that reciprocating motion of the pistons 2 will causes rotation of the gears 4 and 5 which in turn causes rotation of the fly wheel 13. In this manner, power is transferred from the inward (toward the center of the block 1) power stroke of the piston 2 to the flywheel 13 by way of the flange 21, arms 2, and gears 4 and 5.

Another method for the transfer of power to the flywheel 13 is to have both gears 4 and 5 the same size but only the left gear 4 have teeth on both gear wheel surfaces. Gear 5 would have only one set of teeth and the flywheel 13 would in turn have teeth to engage only with the teeth in gear 4 that did not engage with gear 5. Also a second set of gears could be used to make the transfer by making the radius of the engine block larger.

Once pistons 20, arms 3 and gears 4 and 5 are in place, and each gear pair is secured with a plate to the engine block 1, the center main bearing 6 is inserted to finish the block assembly. A thrust bearing may be placed on top surface 25 of this central bearing 6 to support the flywheel 13. Once the main bearing 6 is in place, each of two flywheels 13 are placed over the all of the gears 4 and 5 in the engine 100. Teeth on each of the left gears 4 engage teeth 113 of the flywheel 13. An output shaft is then placed though the two flywheels 13 and central bearing 6, keyed into position and closed off with a housing (not shown) that covers the flywheel 13 and connects to the face of the engine block 1.

In one embodiment, cylinder heads 7 are placed on top of each cylinder opening and bolted into place. A standard fuel injectors 11, spark plugs or glow plugs 10, along with intake 8 and exhaust valves 9 are used in the engine. In the embodiment shown, the valves are electrically actuated valves, are assembled to the cylinder heads 7. Intake manifolds and ports 12 and exhaust manifolds and ports 15 (both shown partially) connect two adjacent cylinder heads. The entrance/exits ports of these manifolds for the intake and for the exhaust would be piped to their respective manifolds. If one wanted to add a standard valve construction it could be accomplished by placing a sinusoidal design to the outside of the flywheel so that the valve lever arm would ride on this curvature producing the required up and down motion needed for the intake and exhaust valve actuation. However, a design incorporating electronic valves can eliminate camshaft, rods and chains.

The engine 100 would function where 180 degree pistons would reach compression and fire followed by the their counterpart at 90 degrees to them. The other 4 cylinders would act in the same manner. This would, however, be just one possible firing sequence. It is advantageous to have opposing cylinders having the same firing timing to have a balanced system. The operation of internal combustion engines is well known and will not be explained further.

Figure 5:
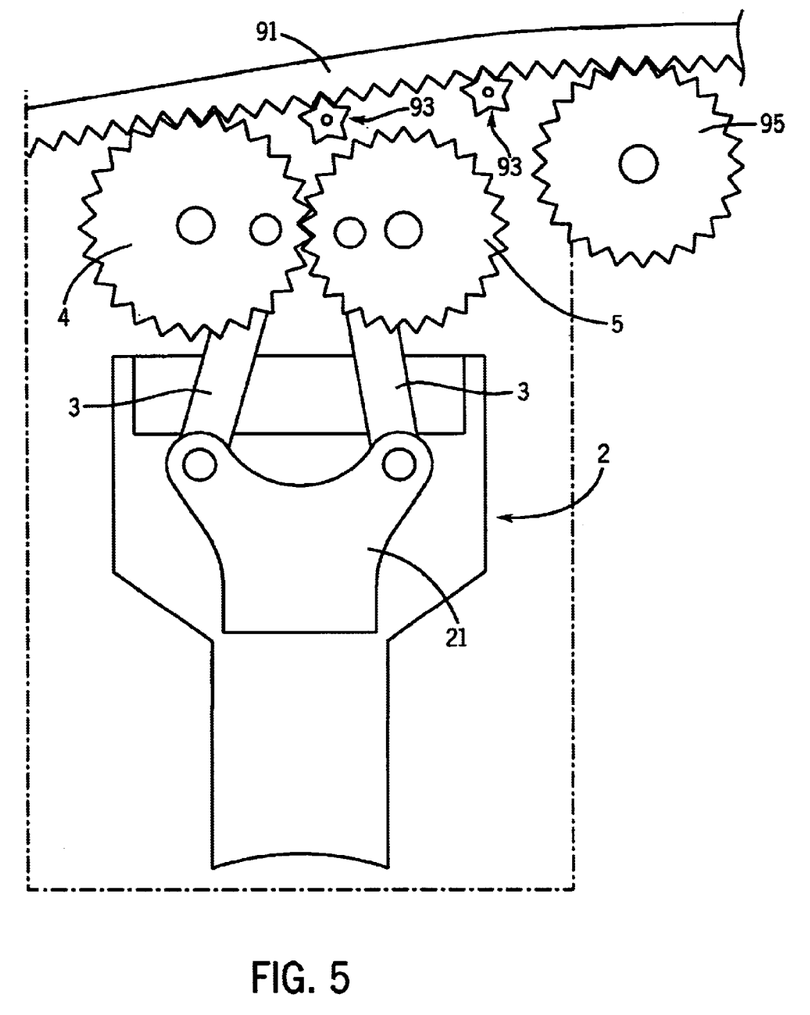
FIG. 5 is a top view of a piston of another engine according to the invention engaging a chain in a chain drive. Like reference numerals are used to depict like parts throughout the Figures.

One skilled in the art would appreciate from FIG. 5 that if one were to take only the two top cylinders 18 and 19 and only the block material around them and make an motorcycle type engine it could have a chain drive that would replace the flywheel 13. The chains 91 (either side) would again engage with the left hand gears 4 and have small sprockets 93 that guide them around the right hand gear 5 to a central power shaft 95. A single cylinder would also be possible with the same type of chain drive but would not have the smooth operation without a counter balance weight.

Therefore, it can be seen that the invention provides an improved radial internal combustion engine. Power is transferred from the engine such that the power take-off is truly balanced, where the piston runs truly parallel to the cylinder walls. This concept reduces wear of the cylinders and piston rings. The engine provides improved gas mileage due to the reduced piston drag. One unique feature is the power take-off from the piston to the flywheels. The design takes power from inside the cylinder compartment, through four transfer arms, to gears that in turn transfer the power to two flywheels. By firing complimentary cylinders 180 degrees at the same time, almost no vibration is noticed. Also, since the cylinders can fire many times per flywheel rotation, the torque which this engine produces is greater other designs. In the present invention, there is no need for counterweights or transmission gearing.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A radial internal combustion engine comprising:
   an engine block having at least one combustion chamber arranged on the periphery of the engine block, each combustion chamber being defined by a cylinder, a reciprocating piston contained within the cylinder, and a cylinder head on the periphery of the engine block;
   an exhaust port associated with and in fluid communication with each combustion chamber;
   an intake port associated with and in fluid communication with each combustion chamber for directing intake air or an air-fuel mixture into its associated combustion chamber;
   a fuel introduction device associated with each intake port and its associated combustion chamber, each fuel introduction device directing fuel into its associated intake port or directing fuel into its associated combustion chamber thereby resulting in an air-fuel mixture in its associated combustion chamber;
   a fuel ignition device associated with each combustion chamber for igniting the air-fuel mixture in its associated combustion chamber;
   an output shaft;
   at least one flywheel secured to the output shaft; and
   at least one rotating gear connected to each piston, at least one rotating gear for each piston engaging a surface of at least one flywheel such that reciprocating motion of each piston causes rotation of each rotating gear engaging a surface of at least one flywheel thereby causing rotation of at least one flywheel,
   wherein a power stroke of each piston inward with respect to the engine block pulls each rotating gear inward with respect to the engine block.

2. The radial internal combustion engine of claim 1 wherein:
   each rotating gear for each piston is connected to the piston by an arm.

3. The radial internal combustion engine of claim 1 wherein:
   combustion within each combustion chamber transfers power to at least one flywheel by way of inward motion of each piston toward the center of the engine block.

4. The radial internal combustion engine of claim 1 wherein:
   each gear is connected to the engine block.

5. The radial internal combustion engine of claim 1 further comprising:
   a housing for covering the engine block and each flywheel.

6. The radial internal combustion engine of claim 1 wherein:
   the output shaft is rotatably disposed in a central bore in the engine block.

7. The radial internal combustion engine of claim 1 wherein:
   the engine has an even number of combustion chambers radially arranged in equal spacing on the periphery of the engine block, and
   the air-fuel mixture is ignited at substantially the same time in each pair of combustion chambers located at diametrically opposed positions on the periphery of the engine block.

8. A radial internal combustion engine comprising:

an engine block having at least one combustion chamber arranged on the periphery of the engine block, each combustion chamber being defined by a cylinder, a reciprocating piston contained within the cylinder, and a cylinder head on the periphery of the engine block;

an exhaust port associated with and in fluid communication with each combustion chamber;

an intake port associated with and in fluid communication with each combustion chamber for directing intake air or an air-fuel mixture into its associated combustion chamber;

a fuel introduction device associated with each intake port and its associated combustion chamber, each fuel introduction device directing fuel into its associated intake port or directing fuel into its associated combustion chamber thereby resulting in an air-fuel mixture in its associated combustion chamber;

a fuel ignition device associated with each combustion chamber for igniting the air-fuel mixture in its associated combustion chamber;

an output shaft;

at least one flywheel secured to the output shaft; and at least one rotating gear connected to each piston, at least one rotating gear for each piston engaging a surface of at least one flywheel such that reciprocating motion of each piston causes rotation of each rotating gear engaging a surface of at least one flywheel thereby causing rotation of at least one flywheel, wherein each rotating gear for each piston is connected to the piston by an arm, and wherein each arm is connected to an end of each piston opposite the cylinder head which partly defines the combustion chamber for each piston.

9. The radial internal combustion engine of claim 8 wherein:

each arm is connected to each piston by a flange.

10. A radial internal combustion engine comprising:

an engine block having at least one combustion chamber arranged on the periphery of the engine block, each combustion chamber being defined by a cylinder, a reciprocating piston contained within the cylinder, and a cylinder head on the periphery of the engine block;

an exhaust port associated with and in fluid communication with each combustion chamber;

an intake port associated with and in fluid communication with each combustion chamber for directing intake air or an air-fuel mixture into its associated combustion chamber;

a fuel introduction device associated with each intake port and its associated combustion chamber, each fuel introduction device directing fuel into its associated intake port or directing fuel into its associated combustion chamber thereby resulting in an air-fuel mixture in its associated combustion chamber;

a fuel ignition device associated with each combustion chamber for igniting the air-fuel mixture in its associated combustion chamber;

an output shaft;

at least one flywheel secured to the output shaft; and at least one rotating gear connected to each piston, at least one rotating gear for each piston engaging a surface of at least one flywheel such that reciprocating motion of each piston causes rotation of each rotating gear engaging a surface of at least one flywheel thereby causing rotation of at least one flywheel, wherein at least two rotating gears are connected to each piston, at least one rotating gear for each piston meshing with at least one other rotating gear for each piston for rotating the other rotating gear, the other rotating gear engaging a surface of at least one flywheel such that reciprocating motion of each piston causes rotation of each other rotating gear engaging a surface of at least one flywheel thereby causing rotation of at least one flywheel.

11. A radial internal combustion engine comprising:

an engine block having at least one combustion chamber arranged on the periphery of the engine block, each combustion chamber being defined by a cylinder, a reciprocating piston contained within the cylinder, and a cylinder head on the periphery of the engine block;

an exhaust port associated with and in fluid communication with each combustion chamber;

an intake port associated with and in fluid communication with each combustion chamber for directing intake air or an air-fuel mixture into its associated combustion chamber;

a fuel introduction device associated with each intake port and its associated combustion chamber, each fuel introduction device directing fuel into its associated intake port or directing fuel into its associated combustion chamber thereby resulting in an air-fuel mixture in its associated combustion chamber;

a fuel ignition device associated with each combustion chamber for igniting the air-fuel mixture in its associated combustion chamber;

an output shaft;

at least one flywheel secured to the output shaft; and at least one rotating gear connected to each piston, at least one rotating gear for each piston engaging a surface of at least one flywheel such that reciprocating motion of each piston causes rotation of each rotating gear engaging a surface of at least one flywheel thereby causing rotation of at least one flywheel, wherein at least two rotating gears are connected to each piston, and at least two rotating gears for each piston are connected to the piston by a pair of parallel, spaced apart arms.

12. A radial internal combustion engine comprising:

an engine block having at least one combustion chamber arranged on the periphery of the engine block, each combustion chamber being defined by a cylinder, a reciprocating piston contained within the cylinder, and a cylinder head on the periphery of the engine block;

an exhaust port associated with and in fluid communication with each combustion chamber;

an intake port associated with and in fluid communication with each combustion chamber for directing intake air or an air-fuel mixture into its associated combustion chamber;

a fuel introduction device associated with each intake port and its associated combustion chamber, each fuel introduction device directing fuel into its associated intake port or directing fuel into its associated combustion chamber thereby resulting in an air-fuel mixture in its associated combustion chamber;

a fuel ignition device associated with each combustion chamber for igniting the air-fuel mixture in its associated combustion chamber;

an output shaft;

at least one flywheel secured to the output shaft; and at least one rotating gear connected to each piston, at least one rotating gear for each piston engaging a surface of at least one flywheel such that reciprocating motion of each piston causes rotation of each rotating gear engaging a surface of at least one flywheel thereby causing rotation of at least one flywheel, wherein at least two rotating gears are connected to each piston, at least two rotating gears for each piston engaging a surface of at least one flywheel such that reciprocating motion of each piston causes rotation of each rotating gear engaging a surface of at least one flywheel thereby causing rotation of at least one flywheel.

13. A radial internal combustion engine comprising:

an engine block having at least one combustion chamber arranged on the periphery of the engine block, each combustion chamber being defined by a cylinder, a reciprocating piston contained within the cylinder, and a cylinder head on the periphery of the engine block;

an exhaust port associated with and in fluid communication with each combustion chamber;

an intake port associated with and in fluid communication with each combustion chamber for directing intake air or an air-fuel mixture into its associated combustion chamber;

a fuel introduction device associated with each intake port and its associated combustion chamber, each fuel introduction device directing fuel into its associated intake port or directing fuel into its associated combustion chamber thereby resulting in an air-fuel mixture in its associated combustion chamber;

a fuel ignition device associated with each combustion chamber for igniting the air-fuel mixture in its associated combustion chamber;

an output shaft;

at least one flywheel secured to the output shaft; and at least one rotating gear connected to each piston, at least one rotating gear for each piston engaging a surface of at least one flywheel such that reciprocating motion of each piston causes rotation of each rotating gear engaging a surface of at least one flywheel thereby causing rotation of at least one flywheel, wherein each rotating gear for each piston is connected to the piston by an arm, and each arm is located exterior to the engine block.

14. A radial internal combustion engine comprising:

an engine block having at least three combustion chambers radially arranged in equal spacing on the periphery of the engine block, each combustion chamber being defined by a cylinder, a reciprocating piston contained within the cylinder, and a cylinder head on the periphery of the engine block;

an exhaust port associated with and in fluid communication with each combustion chamber, each exhaust port including an exhaust valve;

an intake port associated with and in fluid communication with each combustion chamber for directing intake air into its associated combustion chamber, each intake port including an intake valve;

a fuel injector associated with each intake port and its associated combustion chamber, each fuel injector positioned for directing fuel into intake air in its associated intake port or positioned for directing fuel into intake air in its associated combustion chamber to form an air-fuel mixture;

a spark device associated with each combustion chamber for igniting the air-fuel mixture in its associated combustion chamber;

an output shaft;

a first flywheel secured to the output shaft and a second flywheel secured to the output shaft, the first flywheel being disposed on one side of the engine block and the second flywheel being disposed on an opposite side of the engine block; and at least two rotating gears connected to each piston, at least one rotating gear for each piston meshing with at least one other rotating gear for each piston for rotating the other rotating gear, the other rotating gear engaging a surface of at least one flywheel such that reciprocating motion of each piston causes rotation of each other rotating gear engaging a surface of at least one flywheel thereby causing rotation of at least one flywheel.

15. The radial internal combustion engine of claim 14 wherein:

a first pair of rotating gears and a second pair of rotating gears are connected to each piston, one rotating gear for the first pair of each piston meshing with the other rotating gear for the first pair of each piston for rotating the other rotating gear for the first pair, the other rotating gear for the first pair engaging a surface of the first flywheel such that reciprocating motion of each piston causes rotation of the other rotating gear of the first pair thereby causing rotation of the first flywheel, and one rotating gear for the second pair of each piston meshing with the other rotating gear for the second pair of each piston for rotating the other rotating gear for the second pair, the other rotating gear for the second pair engaging a surface of the second flywheel such that reciprocating motion of each piston causes rotation of the other rotating gear for the second pair thereby causing rotation of the second flywheel.

16. The radial internal combustion engine of claim 14 wherein:

a first pair of rotating gears and a second pair of rotating gears are connected to each piston, the first pair of rotating gears being connected to a side of each piston by a pair of parallel, spaced apart arms, and the second pair of rotating gears being connected to an opposite side of each piston by another pair of parallel, spaced apart arms.

17. The radial internal combustion engine of claim 16 wherein:

each gear is connected to the engine block.

18. The radial internal combustion engine of claim 16 wherein:

each arm is connected to each piston by a flange.

19. A radial internal combustion engine comprising:

an engine block having at least one combustion chamber arranged on the periphery of the engine block, each combustion chamber being defined by a cylinder, a reciprocating piston contained within the cylinder, and a cylinder head on the periphery of the engine block;

an exhaust port associated with and in fluid communication with each combustion chamber;

an intake port associated with and in fluid communication with each combustion chamber for directing intake air or an air-fuel mixture into its associated combustion chamber;

a fuel introduction device associated with each intake port and its associated combustion chamber, each fuel introduction device directing fuel into its associated intake port or directing fuel into its associated combustion chamber thereby resulting in an air-fuel mixture in its associated combustion chamber;

a fuel ignition device associated with each combustion chamber for igniting the air-fuel mixture in its associated combustion chamber;

at least one rotating gear connected to each piston, at least one rotating gear for each piston engaging a chain; and a power shaft engaging the chain such that reciprocating motion of each piston causes rotation of each rotating gear engaging the chain thereby causing rotation of the power shaft, wherein a power stroke of each piston inward with respect to the engine block pulls each rotating gear inward with respect to the engine block.

20. The radial internal combustion engine of claim 19 wherein:

at least two rotating gears are connected to each piston, at least one rotating gear for each piston meshing with at least one other rotating gear for each piston for rotating the other rotating gear, the other rotating gear engaging the chain such that reciprocating motion of each piston causes rotation of each other rotating gear engaging the chain thereby causing rotation of the power shaft.

21. The radial internal combustion engine of claim 19 wherein:

at least two rotating gears are connected to each piston, and at least two rotating gears for each piston are connected to the piston by a pair of parallel, spaced apart arms.

22. A radial internal combustion engine comprising:

an engine block having at least one combustion chamber arranged on the periphery of the engine block, each combustion chamber being defined by a cylinder, a reciprocating piston contained within the cylinder, and a cylinder head on the periphery of the engine block;

an exhaust port associated with and in fluid communication with each combustion chamber;

an intake port associated with and in fluid communication with each combustion chamber for directing intake air or an air-fuel mixture into its associated combustion chamber;

a fuel introduction device associated with each intake port and its associated combustion chamber, each fuel introduction device directing fuel into its associated intake port or directing fuel into its associated combustion chamber thereby resulting in an air-fuel mixture in its associated combustion chamber;

a fuel ignition device associated with each combustion chamber for igniting the air-fuel mixture in its associated combustion chamber;

an output shaft;

at least one flywheel secured to the output shaft; and at least one rotating gear connected to each piston, at least one rotating gear for each piston engaging a surface of at least one flywheel such that reciprocating motion of each piston causes rotation of each rotating gear engaging a surface of at least one flywheel thereby causing rotation of at least one flywheel, wherein the engine block includes a cavity such that the piston may be installed from a side of the engine block.

23. A radial internal combustion engine comprising:

an engine block having at least one combustion chamber arranged on the periphery of the engine block, each combustion chamber being defined by a cylinder, a reciprocating piston contained within the cylinder, and a cylinder head on the periphery of the engine block;

an exhaust port associated with and in fluid communication with each combustion chamber;

an intake port associated with and in fluid communication with each combustion chamber for directing intake air or an air-fuel mixture into its associated combustion chamber;

a fuel introduction device associated with each intake port and its associated combustion chamber, each fuel introduction device directing fuel into its associated intake port or directing fuel into its associated combustion chamber thereby resulting in an air-fuel mixture in its associated combustion chamber;

a fuel ignition device associated with each combustion chamber for igniting the air-fuel mixture in its associated combustion chamber;

an output shaft;

at least one flywheel secured to the output shaft; and at least one rotating gear connected to each piston, at least one rotating gear for each piston engaging a surface of at least one flywheel such that reciprocating motion of each piston causes rotation of each rotating gear engaging a surface of at least one flywheel thereby causing rotation of at least one flywheel, wherein the engine includes two flywheels, one flywheel being disposed on one side of the engine block and the other flywheel being disposed on an opposite side of the engine block.

24. A radial internal combustion engine comprising:

an engine block having at least one combustion chamber arranged on the periphery of the engine block, each combustion chamber being defined by a cylinder, a reciprocating piston contained within the cylinder, and a cylinder head on the periphery of the engine block;

an exhaust port associated with and in fluid communication with each combustion chamber;

an intake port associated with and in fluid communication with each combustion chamber for directing intake air or an air-fuel mixture into its associated combustion chamber;

a fuel introduction device associated with each intake port and its associated combustion chamber, each fuel introduction device directing fuel into its associated intake port or directing fuel into its associated combustion chamber thereby resulting in an air-fuel mixture in its associated combustion chamber;

a fuel ignition device associated with each combustion chamber for igniting the air-fuel mixture in its associated combustion chamber;

an output shaft;

at least one flywheel secured to the output shaft; and at least one rotating near connected to each piston, at least one rotating gear for each piston engaging a surface of at least one flywheel such that reciprocating motion of each piston causes rotation of each rotating gear engaging a surface of at least one flywheel thereby causing rotation of at least one flywheel, wherein at least one flywheel has a flange extending outward from its periphery, the flange having a bearing surface that engages and opens each exhaust valve for a first time period and that engages and opens each intake valve for a second time period during rotation of the flywheel.

\* \* \* \* \*